(12) United States Patent
Cho

(10) Patent No.: US 10,107,373 B2
(45) Date of Patent: Oct. 23, 2018

(54) DIFFERENTIAL

(71) Applicant: Hyundai Motor Company, Seoul (KR)

(72) Inventor: Soo Chang Cho, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 51 days.

(21) Appl. No.: 15/345,383

(22) Filed: Nov. 7, 2016

(65) Prior Publication Data

US 2017/0241531 A1 Aug. 24, 2017

(30) Foreign Application Priority Data

Feb. 24, 2016 (KR) ........................ 10-2016-0021589

(51) Int. Cl.
*F16H 48/20* (2012.01)
*F16H 48/08* (2006.01)
*F16H 48/40* (2012.01)

(52) U.S. Cl.
CPC ............. *F16H 48/20* (2013.01); *F16H 48/08* (2013.01); *F16H 48/40* (2013.01); *F16H 2048/087* (2013.01); *F16H 2048/201* (2013.01)

(58) Field of Classification Search
CPC .......... F16H 48/20; F16H 48/08; F16H 48/40; F16H 2048/087; F16H 2048/201
See application file for complete search history.

(56) References Cited

U.S. PATENT DOCUMENTS

| 3,253,672 A * | 5/1966 | Mikina | B60K 23/04 180/338 |
| 3,589,193 A * | 6/1971 | Thornton | A61B 5/221 482/2 |
| 5,007,498 A * | 4/1991 | Wiese | B60K 17/351 180/248 |
| 6,723,017 B2 | 4/2004 | Perkins et al. | |
| 6,762,524 B2 * | 7/2004 | Six | H02K 49/106 310/103 |
| 2003/0211914 A1 * | 11/2003 | Perkins | F16H 48/30 475/231 |
| 2004/0021384 A1 | 2/2004 | Six | |

FOREIGN PATENT DOCUMENTS

| JP | H04-357347 A | 12/1992 |
| JP | H07-023678 U | 5/1995 |
| JP | 2014-085159 A | 5/2014 |
| KR | 10-1995-0031762 | 12/1995 |
| KR | 10-2001-0001349 A | 1/2001 |
| KR | 10-2005-0076079 A | 7/2005 |

* cited by examiner

*Primary Examiner* — Ramya P Burgess
*Assistant Examiner* — David R Morris
(74) *Attorney, Agent, or Firm* — Morgan, Lewis & Bockius LLP

(57) ABSTRACT

A differential may include a metal plate interlocking with a pinion, and at least one permanent magnet fixable to a case of the differential to generate an eddy current in the metal plate upon a relative rotation of the metal plate.

4 Claims, 3 Drawing Sheets

DIFFERENTIAL

CROSS REFERENCE TO RELATED APPLICATION

The present application claims priority to Korean Patent Application No. 10-2016-0021589, filed Feb. 24, 2016, the entire contents of which is incorporated herein for all purposes by this reference.

BACKGROUND OF THE INVENTION

Field of the Invention

The present invention relates to a differential mounted in a vehicle, and more particularly, to a differential including a differential limiting apparatus.

Description of Related Art

A power train of a vehicle distributes power generated from an engine, a motor, or the like to driving wheels disposed in parallel at the left and right of a vehicle to drive the vehicle.

As described above, a function of distributing power to both driving wheels in response to a driving condition of a vehicle is performed by the differential.

That is, the differential performs the differential function of transferring power while absorbing a rotation speed difference between an internal driving wheel and an external driving wheel when a vehicle performs turning drive, such that the vehicle may smoothly perform the turning drive.

By the way, when a difference in frictional forces generated from a contact between each of both driving wheels and a ground is great in a state in which a vehicle is driving rough roads such as a frozen road and a puddle, the differential function of the differential as described above does not appropriately distribute power to both driving wheels, and therefore the vehicle may hardly escape rough roads.

To cope with the above situation, the existing differential includes a differential limiting mechanism. By this configuration, the differential has a complicated configuration and is formed of a mechanical mechanism in which a plurality of components is used, such that it has relatively expensive, has reduced durability, and has an adverse effect on fuel efficiency of a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a differential capable of saving costs, contributing to improvement in fuel efficiency of a vehicle, improving driver's convenience, and providing semi-permanent durability, thereby greatly improving marketability of a vehicle by providing a differential limiting function with a relatively simpler configuration and less weight.

According to various aspects of the present invention, a differential may include a metal plate interlocking with a pinion, and at least one permanent magnet fixable to a case of the differential to generate an eddy current in the metal plate upon a relative rotation of the metal plate.

The metal plate may be coaxially formed in a disk shape with the pinion.

The permanent magnet may be formed in a U-shape in which both ends of the permanent magnet are each spaced apart from both surfaces of the metal plate by a predetermined interval.

The permanent magnet may include a plurality of permanent magnets disposed along a circumferential direction of the metal plate at a predetermined interval.

The permanent magnet may be disposed with at least a portion of the permanent magnet exposed to an outside of the differential case by penetrating through the differential case.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
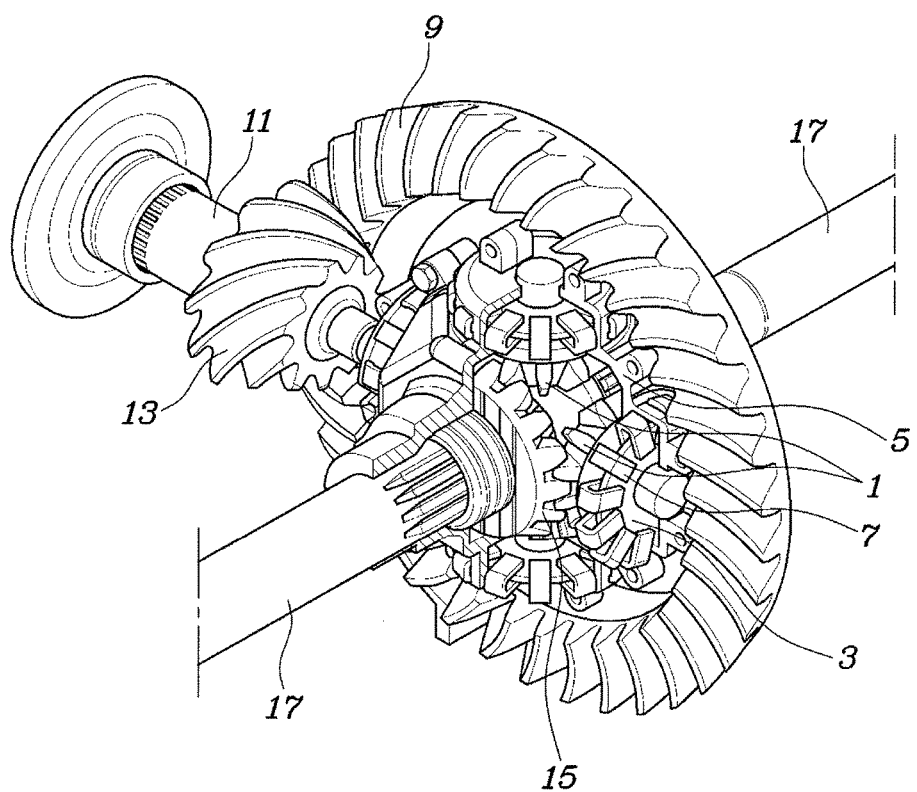
FIG. 1 is a diagram illustrating a structure of a differential according to various embodiments of the present invention.
Figure 2:
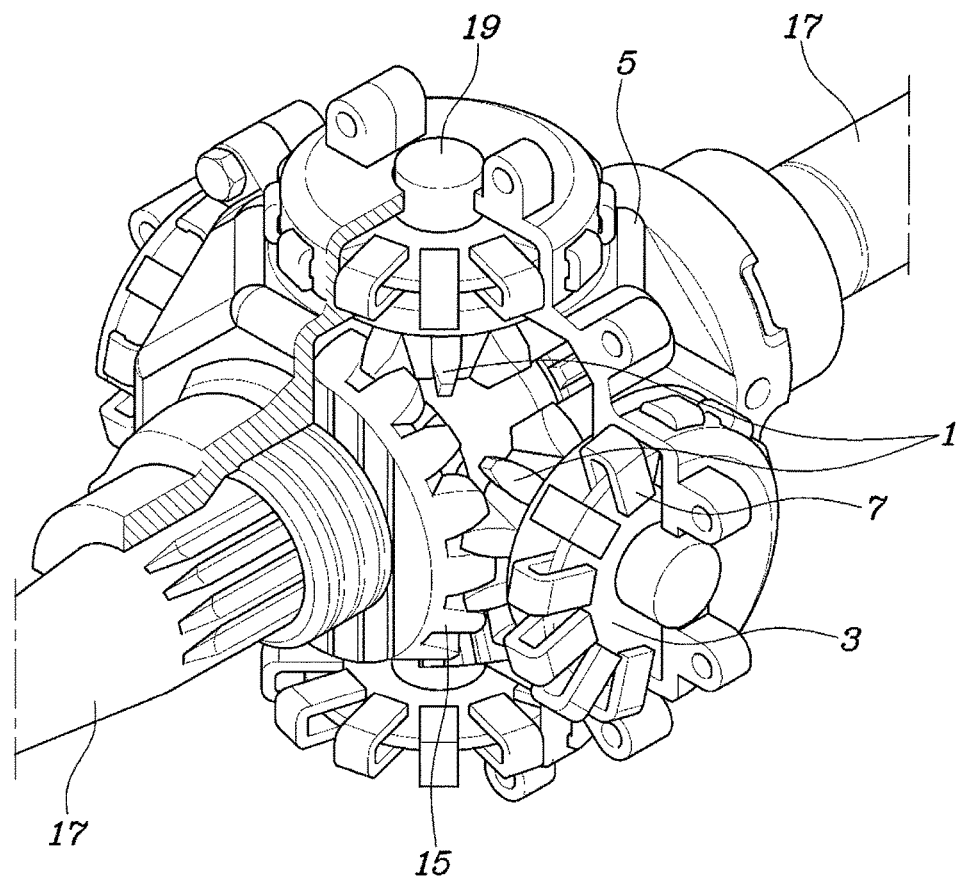
FIG. 2 is a diagram illustrating in more detail main parts of FIG. 1.
Figure 3:
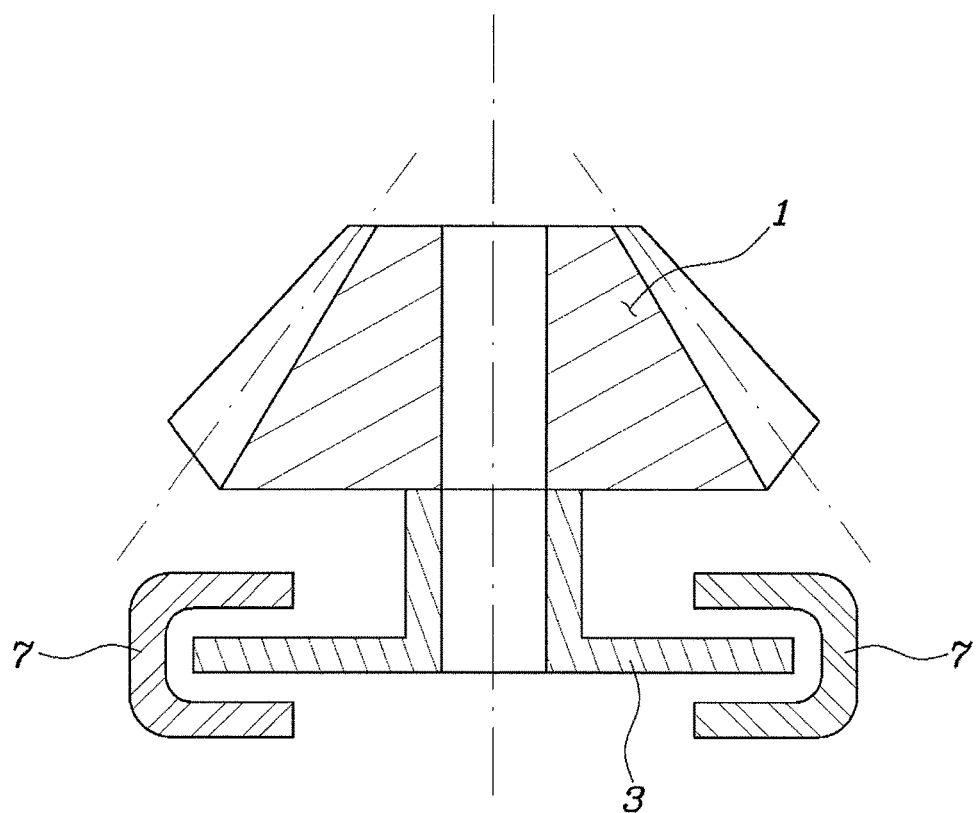
FIG. 3 is a detailed cross-sectional view of a pinion, a metal plate, and a permanent magnet used in the differential of FIG. 1.

Referring to FIGS. 1 to 3, a differential according to various embodiments of the present invention includes a metal plate 3 configured to interlock with a pinion 1 and at least one permanent magnet 7 configured to be fixed to a differential case 5 to generate an eddy current in the metal plate 3 upon a relative rotation of the metal plate 3.

That is, in the differential, a ring gear 9 is meshed with a final reduction gear 13 of a propeller shaft 11 to receive power from power sources such as an engine and a motor, the ring gear 9 is integrally coupled with a differential case 5, an inside of the differential case 5 is provided with a plurality of pinions 1 and both side gears 15 meshed with the pinions 1 to appropriately distribute a rotating force of the differential case 5 to both side gears 15 by a revolution and a rotation of the pinion 1 to thereby transfer power to left and right drive shafts 17 each meshed with the side gears 15 to thereby rotate driving wheels connected the drive shaft 17, and the pinion 1 is provided to be integrally rotated with the metal plate 3.

According to various embodiments of the present invention, four pinions 1 are rotatably installed with respect to a rotating shaft vertical to a rotating shaft of the differential case 5 by a spider 19, the side gears 15 are installed coaxially with the rotating shaft of the differential case 5 in the state in which they are simultaneously meshed with the four pinions 1 and are thus spline-coupled with the drive shaft 17.

The metal plate 3 is formed in a disk form forming the coaxial axis with the pinion 1 and is connected to the pinion 1 by welding and a connection method that may transfer other rotating forces and is thus installed to be rotated on the spider 19 when the pinion 1 is rotated.

The permanent magnet 7 is formed in a U-letter shape in which both ends thereof are spaced apart from both surfaces of the metal plate 3 at a predetermined interval.

According to various embodiments of the present invention, the plurality of permanent magnets 7 is disposed along a circumferential direction of the metal plate 3 at a predetermined interval. Further, the permanent magnet 7 is installed so that at least a portion thereof is exposed to the outside of the differential case 5 by penetrating through the differential case 5.

Therefore, the permanent magnet 7 quickly transfers the heat generated from the inside of the differential case 5 to the outside of the differential case 5, thereby more effectively cooling the heat from the metal plate 3 and the inside of the differential case 5.

In the differential according to various embodiments of the present invention configured as described above, when the ring gear 9 is rotated by being supplied with power from the final reduction gear 13, the differential case 5 is integrally rotated with the ring gear 9.

When the differential case 5 is rotated, the spider 19 is rotated together. In this case, the pinions 1 rotatably installed in the spider 19 are not rotated under the condition that reaction forces at both driving wheels are the same and rotates both side gears 15 while revolving with respect to the side gears 15 together with the rotation of the differential case 5 and the spider 19 to equally distribute power to both driving wheels.

When a vehicle is turned, the frictional forces of both driving wheels on the ground are different and thus the reaction forces are also different. In this case, the pinions 1 are rotated while being revolved together with the differential case 5 to perform the differential function of transferring power while absorbing a rotation speed difference between both side gears 15.

In this case, the metal plate 3 is rotated together with the pinion 1, which causes the metal plate 3 to change a magnetic flux within a magnetic field region formed by the permanent magnet 7, to thereby generate an eddy current in the metal plate 3. The magnetic force by the eddy current is applied in a direction in which the metal plate 3 suppresses the metal plate 3 from being rotated with respect to the permanent magnet 7 in the relationship with the permanent magnet 7 to suppress the rotation of the pinion 1.

Therefore, the increase in the rotation speed of the pinion 1 is limited by the eddy current phenomenon occurring due to the action between the metal plate 3 and the permanent magnet 7, which is the differential limiting function of preventing the severe differential action.

Therefore, when the differential function required for the typical turning drive, or the like is performed, the rotation speed of the pinion 1 is not high, and therefore as the rotation of the pinion 1 is smoothly performed, the appropriate behavior of the vehicle is secured by the appropriate differential action and the sudden rotation of the pinion 1 is prevented by the eddy current phenomenon of the metal plate 3 under the condition that the differential limitation is required in a rough road, or the like, thereby implementing the appropriate differential limiting function.

As described above, a wear, or the like never occurs in the configuration of the permanent magnet 7 contactlessly installed to the metal plate 3 to provide the semi-permanent durability, and additionally required parts are only the metal plate 3 and the permanent magnet 7 and therefore the costs or the weight may be more reduced than an automatic limiting mechanism of other schemes, thereby contributing to savings in the costs of the vehicle and improvement of fuel efficiency.

According to various embodiments of the present invention, it is possible to provide the differential capable of saving costs, contributing to the improvement in fuel efficiency of a vehicle, improving the driver's convenience, and providing the semi-permanent durability by providing the differential limiting function with a relatively simpler configuration and less weight, thereby greatly improving the marketability of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A differential, comprising:
a metal plate interlocking with a pinion; and
at least one permanent magnet fixed to a differential case of the differential to generate an eddy current in the metal plate upon a relative rotation of the metal plate,
wherein the at least one permanent magnet comprises a plurality of permanent magnets disposed along a circumferential direction of the metal plate at a predetermined interval; and
wherein a first portion of the permanent magnets is disposed inside the differential case to be adjacent to the metal plate and a second portion of the permanent magnets is disposed to be exposed to an outside of the differential case by penetrating through the differential case.

2. The differential of claim 1, wherein the metal plate is coaxially formed in a disk shape with the pinion.

3. The differential of claim 2, wherein each of the permanent magnets are formed in a U-shape in which first and second ends of each permanent magnet are each spaced apart from internal and external surfaces of the metal plate by a predetermined interval.

4. The differential of claim 1, wherein the second portion of the permanent magnets is disposed to protrude outwards out of an external surface of the differential case by penetrating through the differential case.

* * * * *